United States Patent
Lira Rueda (10) Patent No.: US 12,462,906 B2
(45) Date of Patent: Nov. 4, 2025

(54) HEALTHCARE DATA PROCESSING CAPACITY MANAGEMENT

(71) Applicant: Roche Diagnostics Operations, Inc., Indianapolis, IN (US)

(72) Inventor: Javier Lira Rueda, Barcelona (ES)

(73) Assignee: ROCHE DIAGNOSTICS OPERATIONS, INC., Indianapolis, IN (US)

(*) Notice: Subject to any disclaimer, the term of this patent is extended or adjusted under 35 U.S.C. 154(b) by 145 days.

(21) Appl. No.: 18/457,388

(22) Filed: Aug. 29, 2023

(65) Prior Publication Data

US 2024/0079101 A1    Mar. 7, 2024

(30) Foreign Application Priority Data

Sep. 2, 2022 (EP) .................................. 22382823

(51) Int. Cl.
  *G16H 10/40* (2018.01)
  *G06F 9/48* (2006.01)
  *G16H 40/20* (2018.01)

(52) U.S. Cl.
  CPC ............ *G16H 10/40* (2018.01); *G06F 9/4843* (2013.01); *G16H 40/20* (2018.01)

(58) Field of Classification Search
  CPC ........ G16H 10/40; G16H 40/20; G16H 10/60; G16H 30/20; G16H 30/40; G16H 40/40;
  (Continued)

(56) References Cited

U.S. PATENT DOCUMENTS

2002/0099273 A1* 7/2002 Bocionek ............... G16H 40/20
                                                            600/300
2002/0152305 A1* 10/2002 Jackson .................. H04L 43/00
                                                            709/224
(Continued)

FOREIGN PATENT DOCUMENTS

JP    2018-045493 A    3/2018
JP    2019-533870 A    11/2019
(Continued)

OTHER PUBLICATIONS

E. Kaljic, A. Maric, P. Njemcevic and M. Hadzialic, "A Survey on Data Plane Flexibility and Programmability in Software-Defined Networking," in IEEE Access, vol. 7, pp. 47804-47840, 2019, doi: 10.1109/ACCESS.2019.2910140. (Year: 2019).*

(Continued)

*Primary Examiner* — Sun M Li
(74) *Attorney, Agent, or Firm* — KATTEN MUCHIN ROSENMAN LLP (57) ABSTRACT

A healthcare data management system for managing processing capacity in a healthcare data management system. The healthcare data management system includes: one or more processing pipelines connected to one or more of the medical devices and configured to receive medical data therefrom, wherein each processing pipeline comprises a plurality of processing stages arranged in series and configured to perform respective operations on the received healthcare data, wherein each processing stage is implemented on a stateless atomic processing unit; a healthcare middleware is configured to receive processed data therefrom and to provide the processed data to a healthcare information management system; a performance management unit is configured to monitor a performance of the or each processing pipeline and adjust a number of stateless atomic pro- (Continued)

| Processing Stage | Processing time / ms | Number of SAP units | @ t = 200 ms and frequency of receipt in pipeline = 0.5 packets / ms | | @ t = 200 ms and frequency of receipt in pipeline = 2 packets / ms | |
|---|---|---|---|---|---|---|
| | | | Number of queued data packets | Queue time if entering pipeline now / ms | Number of queued data packets | Queue Time if joining pipeline now / ms |
| 102a | 1 | 1 | 0 | 0 | 200 | 200 |
| 102b | 10 | 1 | 100 | 1000 | 180 | 1700 |
| 102c | 5 | 3 | 0 | 0 | 0 | 0 | cessing units implementing a given processing stage within a given processing pipeline based on the monitored performance.

19 Claims, 7 Drawing Sheets

(58) Field of Classification Search
CPC ..... G16H 40/63; G06F 9/4843; G06F 9/5027; G06F 2209/508
See application file for complete search history.

(56) References Cited

U.S. PATENT DOCUMENTS

| | | | | |
|---|---|---|---|---|
| 2008/0028068 A1* | 1/2008 | Nochta | ............ | H04W 28/0268 709/224 |
| 2009/0138318 A1* | 5/2009 | Hawkins | ................ | G06Q 10/06 705/7.27 |
| 2015/0186821 A1* | 7/2015 | Wang | ..................... | G16H 20/10 705/2 |
| 2018/0121610 A1* | 5/2018 | Cayle | ..................... | G16H 40/20 |
| 2018/0342324 A1* | 11/2018 | Cha | ........................ | C09K 11/70 |
| 2023/0236886 A1* | 7/2023 | Etemadi | ................ | G16H 50/70 718/104 |

FOREIGN PATENT DOCUMENTS

| | | | | |
|---|---|---|---|---|
| JP | | 2020-166441 A | 10/2020 | |
| WO | | WO-2017015393 A1 * | 1/2017 | ........... A61B 5/7271 |

OTHER PUBLICATIONS

D. E. Diamantis and D. K. Iakovidis, "ASML: Algorithm-Agnostic Architecture for Scalable Machine Learning," in IEEE Access, vol. 9, pp. 51970-51982, 2021, doi: 10.1109/ACCESS.2021.3069857. (Year: 2021).*

Fais A, Lettieri G, Procissi G, Giordano S, Oppedisano F. Data Stream Processing for Packet-Level Analytics. Sensors (Basel). Mar. 3, 2021;21(5):1735. doi: 10.3390/s21051735. PMID: 33802365; PMCID: PMC7959324. (Year: 2021).*

Relaxing state-access constraints in stateful programmable data planes by Carmelo Cascone, Roberto Bifulco, Salvatore Pontarelli, Antonio Capone, arXiv:1703.05442, Submitted on Mar. 16, 2017. (Year: 2017).*

Rongali S, Rose AJ, McManus DD, Bajracharya AS, Kapoor A, Granillo E, Yu H. Learning Latent Space Representations to Predict Patient Outcomes: Model Development and Validation. J Med Internet Res. Mar. 23, 2020;22(3):e16374. doi: 10.2196/16374. PMID: 32202503; PMCID: PMC7136840. (Year: 2020) (Year: 2020).*

European Search Report issued Feb. 7, 2023, in Application No. 22382823.7, 2 pp.

Office Action dispatched Oct. 22, 2024, from Japanese Patent Application No. 2023-141544, 11 sheets including English translation.

Decision to Grant a Patent mailed Apr. 8, 2025, from Japanese Patent Application 2023-141544, 5 sheets including English transation.

* cited by examiner

Fig. 1

| Processing Stage | Processing time / ms | Number of SAP units | @ t = 200 ms and frequency of receipt in pipeline = 0.5 packets / ms | | @ t = 200 ms and frequency of receipt in pipeline = 2 packets / ms | |
|---|---|---|---|---|---|---|
| | | | Number of queued data packets | Queue time if entering pipeline now / ms | Number of queued data packets | Queue Time if joining pipeline now / ms |
| 102a | 1 | 1 | 0 | 0 | 200 | 200 |
| 102b | 10 | 1 | 100 | 1000 | 180 | 1700 |
| 102c | 5 | 3 | 0 | 0 | 0 | 0 |

Fig. 2

| Processing Stage | Processing time / ms | Number of SAP units | @ t = 200 ms and frequency of receipt in pipeline = 0.5 packets / ms | | @ t = 200 ms and frequency of receipt in pipeline = 2 packets / ms | |
|---|---|---|---|---|---|---|
| | | | Number of queued data packets | Queue time if entering pipeline now / ms | Number of queued data packets | Queue Time if joining pipeline now / ms |
| 102a | 1 | 1 | 0 | 0 | 200 | 200 |
| 102b | 10 | 5 | 0 | 0 | 100 | 400 |
| 102c | 5 | 1 | 0 | 0 | 0 | 0 |

| Healthcare Data Packet Metadata | |
|---|---|
| Packet ID | 5-1392 |
| Device ID | 166a |
| Processing stage sequence | 01-22a-04-18c |
| Assigned pipeline | B |
| ... | ... |

Fig. 9

HEALTHCARE DATA PROCESSING CAPACITY MANAGEMENT

CROSS-REFERENCE TO RELATED APPLICATIONS

This application claims priority to European Patent Application No. 22382823.7 filed Sep. 2, 2022, the disclosure of which is hereby incorporated by reference in its entirety.

FIELD OF THE INVENTION

The present invention relates to a computer-implemented method of managing processing capacity in a healthcare data management system, a healthcare data management system, and a non-transitory computer-readable storage medium.

BACKGROUND

In a healthcare data management system, healthcare data received from medical devices, for example, point of care medical devices or laboratory instruments, typically requires further processing prior to it being output to a healthcare information management system for appraisal by medical professionals and the like. As an example, where a medical device carries out NMR spectroscopy on a sample, the medical device may provide the spectrum as the output data. Rather than that spectrum being provided to the healthcare information management system for appraisal by a medical professional, it may be desirable to determine the molecular structure that spectrum corresponds to, with the molecular structure being output to the healthcare information management system either with or without the underlying spectrum. Thus, users of the healthcare information management system are provided with information that is easier for them to utilise.

Such processing is conventionally conducted in a series of processing stages. Continuing with the example of NMR spectrum analysis, a first stage may be filtering the spectrum to reduce noise, a second stage may be identification of peaks within the spectrum and a third stage may be correlation of the identified peaks to a known substance.

This processing may be conducted on one or more processing units within one or more computers. The demand for processing capability within the healthcare data management system may fluctuate, for example with the number of medical devices being used at a given time or maintenance of processing units. However, in conventional healthcare data management systems, the distribution, allocation and/or number of processing units for carrying out the data processing is fixed. Therefore, conventional healthcare data management systems cannot respond to either peaks or troughs in demand for processing capacity. Such inflexibility is inefficient, because there will be periods of time in which the available processing capacity for a certain processing stage is greater than it needs to be and the available processing capacity for another processing stage is insufficient to meet the demand for that processing stage. Insufficient processing capacity for a given processing stage results in processing times being longer than would be the case with greater processing capacity for that processing stage, meaning that medical professionals and the like have to wait longer after a medical test is carried out to obtain the results of that test; moreover, underutilised processing capacity represents an energy and cost burden.

It is commonly the case that of the stages making up a given data processing operation, one or more of the stages takes a substantially longer time to complete than other stages of the data processing operation. Continuing with the earlier example, identifying the peaks in the NMR spectrum may be a step that a processing unit can conduct more quickly than the step of associating the identified peaks with a chemical structure.

The present invention has been devised in light of the above considerations.

SUMMARY

Accordingly, in an aspect, embodiments provide a computer-implemented method of managing processing capacity in a healthcare data management system, the healthcare data management system including:
  a plurality of medical devices, which generate healthcare data;
  one or more processing pipelines, which receive healthcare data from the one or more medical devices, where the or each processing pipeline is formed of a plurality of processing stages, the processing stages being arranged in series and performing respective operations on the received healthcare data, where each processing stage is implemented on a stateless atomic processing unit;
  a healthcare middleware, which receives processed data from the one or more processing pipelines and provides the processed data to a healthcare information management system;
  a performance management unit, which manages the processing capacity of the or each processing pipeline.
The computer-implemented method of the first aspect comprises steps of:
  monitoring, by the performance management unit, a performance of the or each processing pipeline; and
  adjusting, by the performance management unit, a number of stateless atomic processing units implementing a given processing stage within a given processing pipeline based on the monitored performance.

Such a method of managing processing capacity reduces the time taken to process data from medical devices, because the processing capacity of the healthcare data management system is adapted to the existing process demand by using stateless atomic processing units that can be deployed in a modular fashion. This ultimately means that medical professionals and the like can be provided with medical test results sooner after the tests have been conducted. Moreover, such a method reduces memory consumption within the healthcare data management system and reduces underutilization of processing capacity within the healthcare data management system.

By processing pipelines, it may be meant a data pipeline, both of which may be understood as a set of data processing elements (e.g., processing stages) connected in series, where the output of one element is the input of the next. By stateless processing unit, it may be understood that the processing unit is instantiated without any knowledge or reference to past processes which have been performed and each operation performed by the stateless processing unit is performed entirely on the information which comes with the input. By atomic stateless processing unit, it may be understood that the stateless processing unit is not divisible any further, that is it performs an operation which is not conceptually divisible any further.

Some embodiments may be applied to a healthcare data management system wherein there is a plurality of processing pipelines, and one or more processing stages within a given processing pipeline of the plurality of processing pipelines is/are shared with another processing pipeline of the plurality of processing pipelines, or a subset (e.g. more than one) of the plurality of processing pipelines. Accordingly, where there is a processing stage that is shared amongst multiple processing pipelines, the processing time of multiple pipelines can be reduced by increasing the number of stateless atomic processing units implementing a single stage and greater flexibility is provided within the healthcare data management system with regards to allocation of processing capacity.

The step of monitoring the performance of the or each processing pipeline may be conducted by the performance management unit comparing a performance parameter to a performance threshold. Advantageously, the performance management unit is thus provided with a quantitative method of measuring the performance of the system so that an objective decision can be made with regards to the adjustment of the number of stateless atomic processing units implementing a given processing stage.

The performance parameter monitored by the performance management unit may include one or more of: an amount of memory used by a given processing pipeline or processing stage; a time taken for healthcare data received from a given medical device to arrive at the healthcare middleware; and an amount of processing capacity used by a given processing pipeline or processing stage. This is beneficial in that the monitoring conducted by the performance management unit can thus reflect the properties of the healthcare data management system that are important and influenced by the number of stateless atomic processing units implementing a given processing stage: the time taken for processed data to be provided to the healthcare information management system after the associated test(s) are taken, and the amount of processing capacity and memory in use.

Some embodiments may be applied to a healthcare data management system wherein the one or more medical devices are one or more laboratory instruments and/or one or more point of care devices. Advantageously, this can increase the flexibility of the method with regards to the different healthcare data management systems it can be applied to.

In some embodiments, the performance management unit may receive definitions of one or more processing pipelines, the definitions specifying one or more processing stages for the or each processing pipeline, and may create additional processing pipelines based on the monitored performance; the performance management unit may create a single additional processing pipeline, or may create multiple additional processing pipelines. Equivalently, the performance management unit may remove one or more processing pipelines based on the monitored performance. This is advantageous in providing a method with greater flexibility in how the processing capacity of the healthcare data management system is managed. This is illustrated by an example where the demand on several stages within a given processing pipeline exceeds the processing capacity of those stages, where the whole pipeline can then be duplicated as an alternative to, or in addition to, increasing the number of stateless atomic processing units implementing those processing stages of the pipeline. Similarly, if the performance management unit is able to remove one or more processing pipelines, then this can allow a whole processing pipeline to be removed when the monitored performance indicates the pipeline is underutilized and/or a plurality of processing stages forming that processing pipeline is underutilized.

A given or each atomic processing unit within the healthcare data management system, the number of which is adjusted by the method of the first aspect, may be provided as either physical machine or a virtual machine. By virtual machine, it may be meant either a virtualised hardware stack together with virtualised operating system, or a container runtime (a specific application/executable/software suite run within a virtualised container). Advantageously, providing the atomic processing unit as a virtual machine can reduce provisioning and deployment times. Advantageously, providing a given or each atomic processing unit as a physical machine may enhance the processing throughput.

Some embodiments may further comprise the performance management unit increasing a number of stateless atomic processing units implementing a given processing stage within a given processing pipeline when the monitored performance indicates the given processing pipeline is overutilized; and decreasing a number of stateless atomic processing units implementing a given processing stage within a given processing pipeline, or removes one or more processing pipelines, when the monitored performance indicates a given processing pipeline is underutilized. Accordingly, the method of the first aspect is able to suitably respond to changes in the demand for processing capacity in the healthcare data management system.

In some embodiments a healthcare data management system includes:
  a plurality of medical devices, configured to generate healthcare data;
  one or more processing pipelines, connected to one or more of the medical devices and configured to receive the medical data therefrom, wherein the or each processing pipeline is formed of a plurality of processing stages, the processing stages being arranged in series and configured to perform respective operations on the received healthcare data, wherein each processing stage is implemented on a stateless atomic processing unit;
  a healthcare middleware, connected to the or each processing pipeline and configured to receive processed data therefrom and to provide the processed data to a healthcare information management system;
  a performance management unit, configured to manage the processing capacity of the or each processing pipeline by:
    monitoring a performance of the or each processing pipeline; and
    adjusting a number of stateless atomic processing units implementing a given processing stage within a given processing pipeline based on the monitored performance.

Such a healthcare data management system is able to reduce the waiting time for processing data from medical devices, because the processing capacity of the healthcare data management system is adapted to the existing process demand by using stateless atomic processing units that can be deployed in a modular fashion. This ultimately means that medical professionals and the like can be provided with medical test results sooner after the test has been conducted. Moreover, such a healthcare data management system reduces memory consumption associated with its operation and reduces its underutilization of processing capacity.

A healthcare data management system may include any one, or any combination insofar as they are compatible, of the optional features set out with reference to the present disclosure.

In some embodiments a non-transitory computer-readable storage medium, containing machine executable instructions which, when executed on one or more processors, cause the processor(s) to perform computer-implemented methods such as described.

BRIEF DESCRIPTION OF THE DRAWINGS

Embodiments of the disclosure will now be described by way of examples with reference to the accompanying figures in which.

DETAILED DESCRIPTION

Aspects and embodiments of the present disclosure will now be discussed with reference to the accompanying figures. Further aspects and embodiments will be apparent to those skilled in the art.

Figure 1:
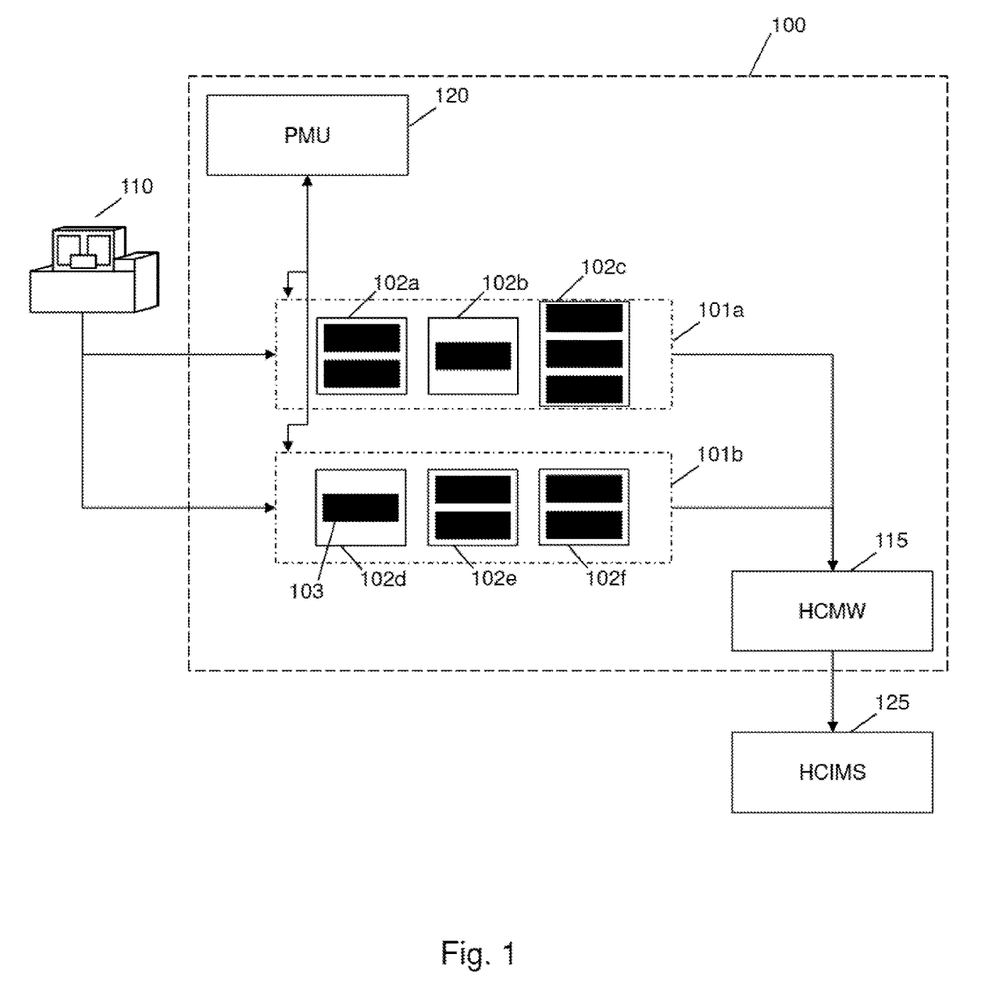
FIG. 1 is a diagram illustrating the flow of data through a healthcare data management system.

FIG. 1 is a diagram illustrating the flow of data through a healthcare data management system 100. A medical device, in the case of FIG. 1, a laboratory instrument 110, is connected to two data processing pipelines 101a, 101b of the healthcare data management system 100. The processing pipelines 101a, 101b are then themselves connected to a healthcare middleware (HCMW) 115, which in turn outputs data from the healthcare data management system 100 into a healthcare information management system 125, which may be a laboratory management system (LMS), laboratory information system (LIS), or hospital information system (HIS), for use by medical professionals and the like to access the data output by the HCMW 115. The two processing pipelines 101a, 101b in FIG. 1 are also connected to a performance management unit (PMU) 120 within the healthcare data management system 100.

The laboratory instrument 110 can be used to carry out one or more tests that generate healthcare data, for example, the testing of blood glucose levels in a sample, the existence of an analyte in a sample, reading of DNA or RNA sequences, mass spectrometry testing, blood gas analysis and the like. Having carried out one or more tests, and thereby generated healthcare data, the healthcare data is sent from the medical device (i.e. the laboratory instrument 110) to a processing pipeline 101 within a healthcare data packet.

The processing pipelines 101 process the healthcare data that they receive into processed data that can be utilised by end users of the healthcare information management system 125. In one example, the medical device may be an NMR machine, and the healthcare data provided by the NMR machine may comprise an NMR spectrum. A processing pipeline 101n may then process the NMR spectrum it receives from the medical device into a molecular structure corresponding to the spectrum output by the NMR machine. Each processing pipeline 101n is formed of a plurality of processing stages 102n, which respectively conduct different operations on the data passing through the pipeline 101n. The processing stages 102n of a pipeline 101n are arranged in series within the pipeline 101n and define the overall process executed by that pipeline 101n on the healthcare data it receives. In FIG. 1, processing pipeline 101a comprises processing stages 102a, 102b and 102c, whilst processing pipeline 101b comprises processing stages 102d, 102e and 102f. Both processing pipelines 101a, 101b in FIG. 1 receive data from the same laboratory instrument 110; the healthcare data received by each processing pipeline 101 may be the same as the healthcare data received by another processing pipeline 101, or a given medical device may provide different healthcare data to each processing pipeline 101 to which it is connected. In any case, since the processing pipelines 101a, 101b in FIG. 1 comprise different processing stages 102 to each other, even in the case that the healthcare data supplied to both those processing pipelines 101 from the laboratory instrument 110 is the same, the processed data output to the HCWM 115 by each will be different, as the healthcare data will have undergone different processing in each processing pipeline 101. To continue with the earlier example related to NMR data, the overall process conducted by a pipeline 101 of receiving an NMR spectrum and outputting a corresponding molecular structure may comprise the processing stages 102 of (i) filtering the spectrum to reduce noise, (ii) identification of peaks within the spectrum, and (iii) correlation of the identified peaks to a known substance.

Each processing stage 102 within a processing pipeline 101 is implemented on a stateless atomic processing (SAP) unit 103. The processing unit 103 being a 'stateless' processing unit means that there is no record of preceding events in a given sequence of interactions with another computer or program, a device or other outside element; each interaction request (i.e. the receipt of data from a preceding processing stage 102, or elsewhere in the healthcare data management system 100) has to be handled by the processing unit 103 based entirely on information that comes with that interaction request. The processing unit 103 being an 'atomic' processing unit means that the process carried out by that processing unit 103 is an indivisible and irreducible series of operations that either occur in their entirety, or not at all.

Since the processing stages 102 are implemented on SAP units 103, the healthcare data packet, together with the analytical data obtained from the tests conducted by the medical device, also contains metadata allowing the healthcare data packet to be provided to the correct processing pipeline 101 with the correct series of processing stages 102 so that the desired processed data is obtained from the healthcare data. The healthcare data packet metadata is discussed further in relation to FIG. 9. Where a processing stage is implemented on a single SAP unit, the SAP unit and processing stage can be referred to by the system via the same identifier e.g., 102d. However, where a processing stage is duplicated across a plurality of SAP units (for example 102a), the system refers to a given SAP implementing that processing stage: e.g., 102a1 and 102a2. It can be understood that where a processing stage is duplicated across n SAP units, this is the equivalent of providing n pipelines containing the same processing stages.

It can be appreciated that certain processing stages 102 making up a processing pipeline 101 may take a substantially longer time to complete than other processing stages 102 making up that processing pipeline 101. Referring back to the NMR example discussed above, for example, when each stage is provided with the same processing power, identifying the peaks in an NMR spectrum may be a processing stage 102 that can be executed in a shorter period of time than the processing stage 102 of associating the identified peaks with a chemical structure. When considering a scenario where multiple packets of healthcare data are being sent to a given processing pipeline 101, it is evident that the processing stage 102 that is the slowest amongst the processing stages 102 making up that processing pipeline 101 can become a bottleneck within that processing pipeline 101 with regards to the time taken for a packet of healthcare data to pass through the processing pipeline 101.

Figure 2:
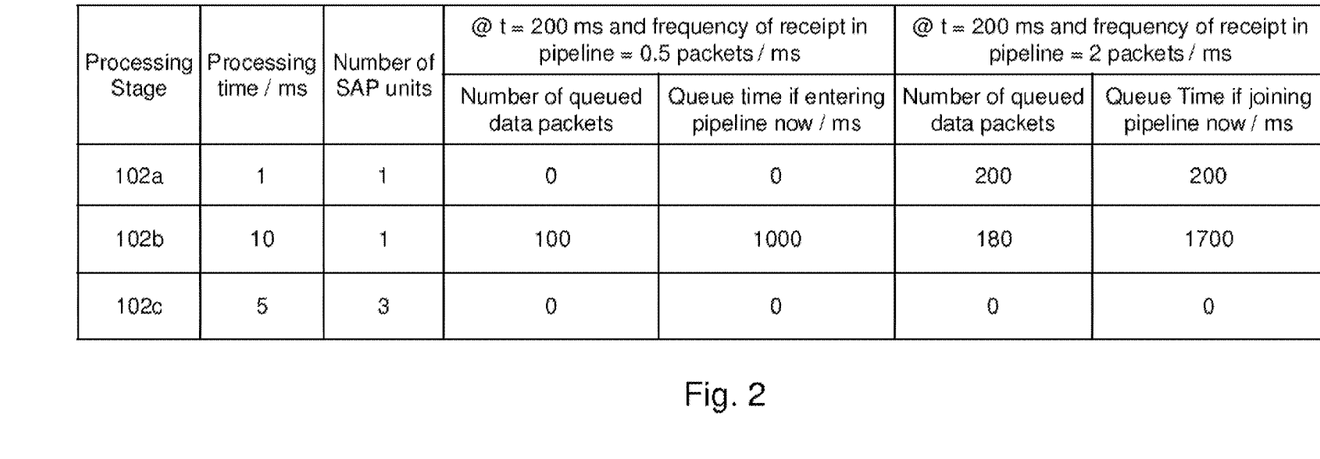
FIG. 2 is a table of data relating to the processing of information by the individual processing stages making up a processing pipeline.

This bottlenecking issue is illustrated by the data in the table of FIG. 2. The table provides the three processing stages 102 making up a processing pipeline 101 along with the processing time for each processing stage 102 (the average time an SAP unit 103 requires to carry out the processing stage 102 on a packet of healthcare data) and the number of SAP units 103 implementing each processing stage 102.

Data is then presented for two scenarios: a first scenario in which a new healthcare data packet has entered the pipeline every 2 ms for the past 200 ms, starting at time, t=0 ms where the processing pipeline is empty; and a second scenario in which a new healthcare data packet has entered the pipeline every 0.5 ms for the past 200 ms, starting at time, t=0 ms where the processing pipeline is empty. If a data packet is passed to a processing stage 102 that is already occupied with processing an earlier data packet, that data packet will join a queue to be processed by the processing stage 102. For each of the two scenarios discussed above, the number of data packets that will be queued at each processing stage 102 at the time a data packet entering the processing pipeline 101 at t=200 ms arrives at that processing stage is provided, along with the time that that data packet will then spend in that queue as a result. Under the first scenario, the only queue that arises within the processing pipeline 101 is for processing stage 102b. Each data packet arriving at processing stage 102a is processed before the next data packet arrives (because the processing time for processing stage 102a is 1 ms and the packets arrive at processing stage 102a every 2 ms, since it is the first stage in the processing pipeline 101) and each data packet leaving processing stage 102b and passing to processing stage 102c is processed before the next data packet arrives at processing stage 102c (because the processing time for processing stage 102c is 5 ms and the packets arrive at processing stage 102c every 10 ms, since this is the processing time for the preceding processing stage 102c and there is a single SAP unit 103 implementing processing stage 102b). Whereas, data packets arrive at processing stage 102b from processing stage 102a every 2 ms, and processing stage 102b takes 10 ms to process each data packet, meaning that a queue develops for processing stage 102b. A data packet entering the processing pipeline 101 at t=200 ms will then spend 1000 ms in a queue for processing stage 102b.

Under the second scenario, where the processing times of each processing stage 102 and number of SAP units 103 carrying out each processing stage 102 is the same, it can be seen that an increase in the frequency of healthcare data packets entering the processing pipeline 101 causes an even larger queue to develop for processing stage 102b, as well as causing a queue to develop for processing stage 102a because the processing time for stage 102a is greater than the time interval between healthcare data packets arriving at processing stage 102a; note that no queue develops for processing stage 102c, despite the processing time for stage 102c being greater than the time interval between healthcare data packets entering the processing pipeline 101a, because processing stage 102b is already acting as a bottleneck.

The present invention addresses the issue of bottlenecking that can arise in a processing pipeline 101 by being able to adjust the number of SAP units 103 implementing a given processing stage 102 within a given processing pipeline 101. The concept of multiple SAP units implementing a given processing stage 102 is illustrated in FIG. 1 by the processing stage 102a in pipeline 101a containing two SAP units 103, whist the processing stage 102b in pipeline 101a contains a single SAP unit 103, and the processing stage 102c in pipeline 101a contains three SAP units 103. Broadly, for a given processing pipeline 101, the PMU 120 monitors the performance of that processing pipeline 101 and subsequently the PMU 120 can decide to adjust the number of SAP units 103 implementing a given processing stage 102 within that pipeline 101 based on the monitored performance. The monitoring and adjusting steps conducted by the PMU 120 are discussed further in relation to FIGS. 5-8.

Figure 3:
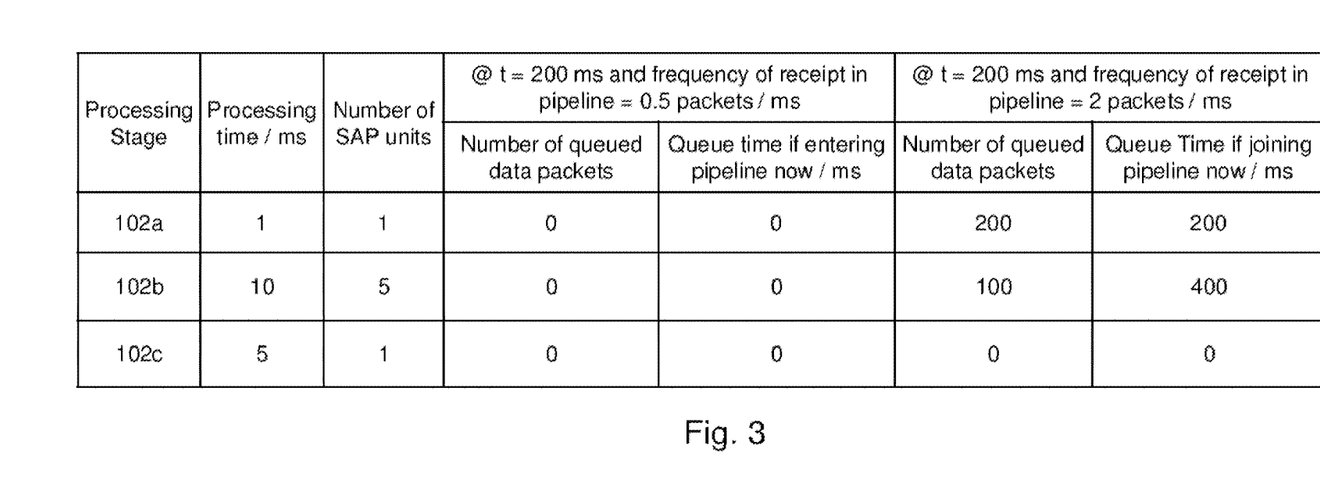
FIG. 3 is a table of data relating to the processing of information by the individual processing stages making up a processing pipeline.

FIG. 3 provides a table of data illustrating how the present invention can address the bottlenecking issue discussed above with reference to FIG. 2. The data in the table of FIG. 3 is the same as in the table of FIG. 2, except that the PMU 120, having monitored the performance of the processing pipeline 101, has adjusted the number of SAP units 103 implementing processing stages 102b and 102c within the processing pipeline 101. The number of SAP units 103 implementing processing stage 102b is adjusted because, under both scenarios in FIG. 2 (healthcare data packets entering every 2 ms and entering every 0.5 ms) the processing stage 102b was the cause of an increase in the processing time for healthcare data packets entering the pipeline 101 due to a queue developing for processing stage 102b. The number of SAP units 103 implementing processing stage 102c is adjusted because, under both scenarios the processing stage 102b is not the cause of any increase in the processing time for healthcare data packets entering the pipeline 101 and currently three SAP units 103 are implementing processing stage 102c, meaning that there is underutilized processing capacity within the healthcare data management system 100.

In FIG. 3, the number of SAP units 103 on which processing stage 102b is implemented is increased from one to five. Each SAP unit 103 for a given processing stage 102 is in parallel with the other SAP unit 103 for that processing stage 102, meaning that, in the case of FIG. 3, processing stage 102b can now be conducted on up to five different data packets simultaneously. The result of the adjustment to the number of SAP units 103 implementing processing stage 102b is that the queue for processing stage 102b under the first scenario in FIG. 2 is eliminated in FIG. 3 and the queue for processing stage 102b under the second scenario in FIG. 2 is substantially reduced in FIG. 3. Additionally, in FIG. 3, the number of SAP units 103 on which processing stage 102c is implemented is decreased from three to one.

Although this adjustment means that processing stage 102c can only be conducted on one data packet at a time, this does not hinder the passing of data through the processing pipeline 101 because there is still sufficient processing capacity for processing stage 102c that a data packet sent from processing stage 102b to 102c can begin being processed as soon as it arrives at processing stage 102c.

Accordingly, it can be seen that the present invention can reduce the waiting time for processing data from medical devices, because the processing capacity of the healthcare data management system 100 is adapted to the existing process demand by using SAP units 103 that can be deployed in a modular fashion. This ultimately means that medical professionals and the like can be provided with medical test results sooner after the test has been conducted. Moreover, underutilization of processing capacity within the healthcare data management system 100, 400 can be reduced and the saved processing capacity can be utilised elsewhere in the healthcare data management system 100, 400.

Figure 4:
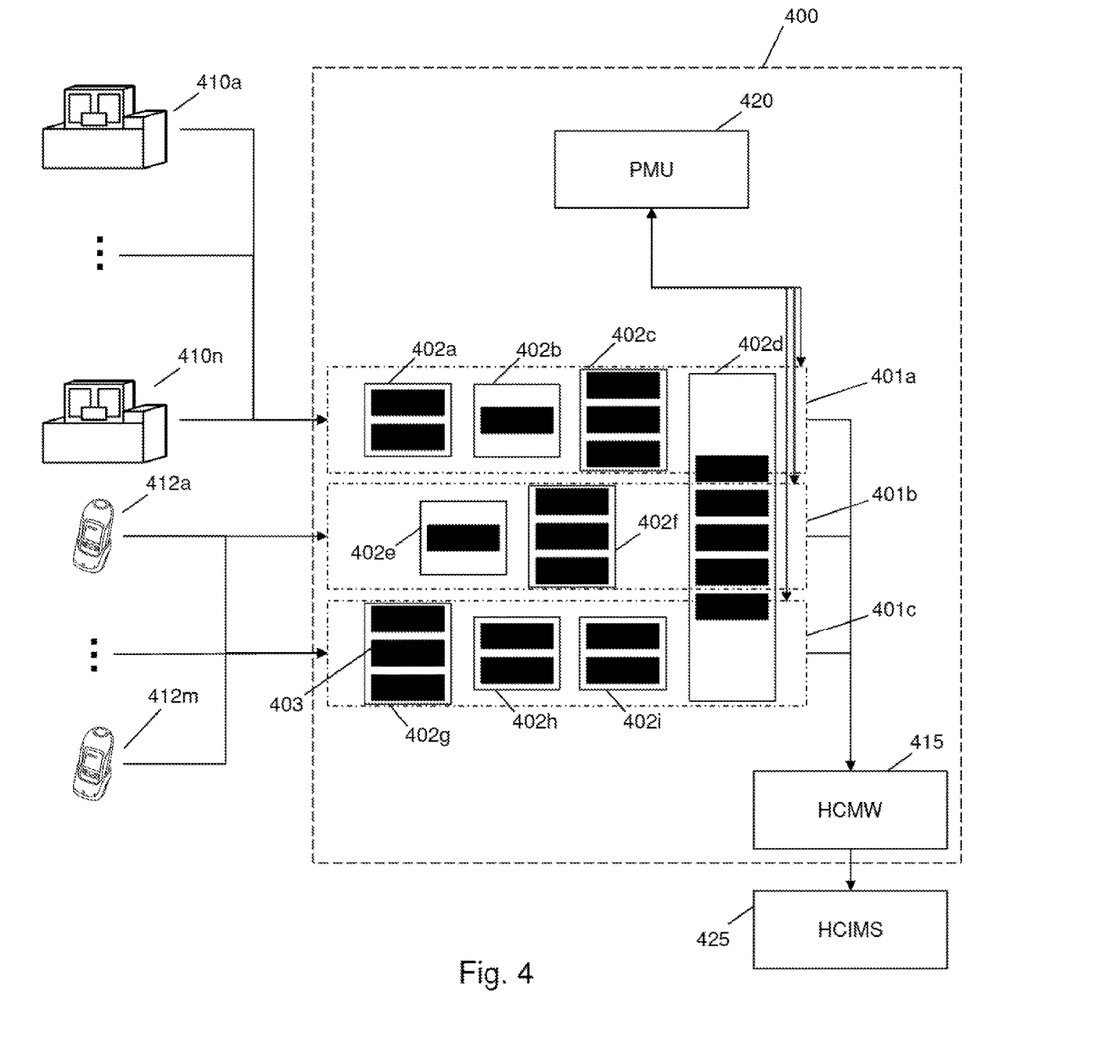
FIG. 4 is a diagram illustrating the flow of data through a healthcare data management system.

FIG. 4 is a diagram illustrating the flow of data through a healthcare data management system 400. The healthcare data management system 400 in FIG. 4 contains a number of modifications over the healthcare data management system 100 in FIG. 1.

Firstly, rather than the single laboratory instrument 110 in FIG. 1, the healthcare data management system 400 in FIG. 4 contains a plurality of medical devices of different types. Specifically, present in the healthcare data management system 400 of FIG. 4 is a plurality of laboratory instruments 410a-410n and a plurality of point-of-care (POC) devices 412a-412m.

Moreover, in FIG. 4 there are three processing pipelines 401a, 401b, 401c, all three of which are in communication with the PMU 420. Processing pipeline 401a receives healthcare data from the plurality of laboratory instruments 410, whilst processing pipelines 401b and 401c both receive healthcare data from the plurality of POC devices 412. Processing pipelines 401a and 401c are formed of four processing stages (402a-402d for processing pipeline 401a; 402g, 402h, 402i and 402d for processing pipeline 401c), whilst processing pipeline 401b is formed of three processing stages (401e, 401f and 401d). As in FIG. 1, the number of SAP units 403 on which each processing stage is implemented varies between each of the processing stages 402 in FIG. 4. Processing pipelines 401b and 401c may receive the same healthcare data as each other from a POC device 412, or the POC device 412 may provide different healthcare data to each processing pipeline 401. In any case, since the processing pipelines 401b and 401c comprise different processing stages 402 to each other, even in the case that the healthcare data supplied to both of them from a POC device 412 is the same, the processed data output to the HCMW 415 by the two processing pipelines 401b, 401c will be different, as the healthcare data will have undergone different processing in each processing pipeline 401b, 401c.

In FIG. 4, the processing stage 402d is common to more than one processing pipeline (in this case, processing stage 402d is common to all three processing pipelines), and accordingly, the SAP units 403 on which processing stage 402d is implemented are shared across the processing pipelines 401 to which that processing stage 402d is common. The processing stage 402 that is common to more than one processing pipeline may be a process such as exporting the processed data from a preceding processing stage in a certain format. In FIG. 4, there are five SAP units 403 on which the processing stage 402d is implemented, and a data packet passing through any of the proceeding pipelines 401 can be passed to any of the SAP units 403 implementing processing stage 402d (i.e. a given SAP unit 403 implementing processing stage 402d can receive a data packet from any of proceeding stages 402c, 402f or 402i). Although the common processing stage 402d in FIG. 4 is the final processing stage 402 of each processing pipeline 401, the position of a common processing stage 402 within a processing pipeline 401 is not particularly limited. A common processing stage 402 could be the first processing stage 402 within a given processing pipeline 401, or an intermediate processing stage 402 within a given processing pipeline 401. Accordingly, where there is a processing stage 402 that is common to multiple processing pipelines 401, the processing time of multiple processing pipelines 401 can be reduced by increasing the number of SAP units 403 in a single processing stage 402 and the healthcare data management system 400 can be made more flexible with regards to handling variations in the rate at which healthcare data packets are received by different processing pipelines 401.

Figure 5:
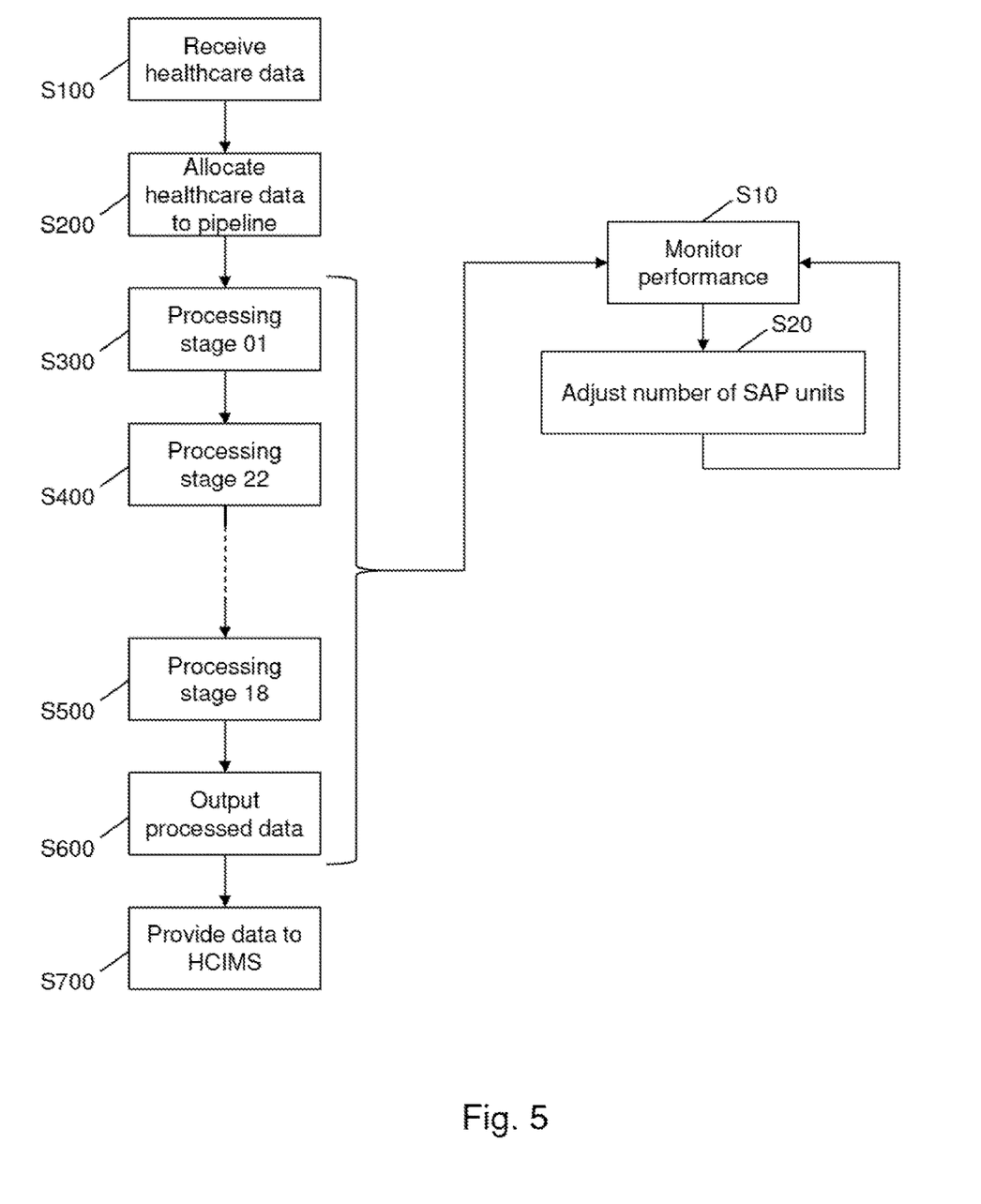
FIG. 5 includes a process flow diagram for a healthcare data management system processing healthcare data and a process flow diagram for a method of managing the processing capacity of that healthcare data management system.

FIG. 5 includes a process flow diagram (PFD) for a healthcare data management system 100, 400 processing healthcare data (steps S100-S700) and a PFD for a process of managing the processing capacity of that healthcare data management system (steps S10-S20). Firstly, the PFD of the healthcare data management system 100, 400 processing healthcare data will be explained.

At step S100, a healthcare data packet is received from a medical device, for example a laboratory instrument 110, 410 or a POC device 412. Then, at step S200, based on metadata included within the healthcare data packet, the healthcare data packet is allocated to a given processing pipeline 101, 401 within the healthcare data management system 100, 400. The healthcare data packet then enters the allocated processing pipeline 101, 401 and proceeds to pass through the various processing stages 102, 402 included within that processing pipeline (S300-S500), as discussed above in relation to FIGS. 1 and 4, with each processing stage 102, 402 being implemented on one or more SAP units 103, 403. Once the healthcare data packet has been processed into processed data by a processing pipeline 101, 401, at step S600 the processed data is outputted to a HCMW 115, 415, which at step S700 provides the processed data to a HCIMS 125, 425.

Whilst the healthcare data management system 100, 400 is processing healthcare data according to steps S100-S700, the PMU 120, 420 is carrying out the process of managing the processing capacity of the healthcare data management system 100, 400. As step S10, the PMU 120, 420 monitors the performance of the processing pipeline(s) 101, 401 within the healthcare data management system 100, 400. Then, at step S20, based on the results of the performance monitoring at step S10, the PMU can adjust the number of SAP units 103, 403 implementing a given processing stage 102, 402 within a given processing pipeline 101, 401 in order to adjust the performance of the monitored processing pipeline(s). Having carried out step S20, the PMU 120, 420 may return to step S10 for further performance monitoring of one or more processing pipelines 101, 401 whilst the healthcare data management system 100, 400 is operating.

This process of managing the processing capacity of the healthcare data management system 100, 400 can be understood by reference to FIGS. 2 and 3, which can represent the states of the healthcare data management system 100, 400 before and after steps S10-S20 have been conducted, respectively. In FIG. 2, only one SAP unit 103, 403 is conducting processing stage 102b and the performance of the pipeline 101a that processing stage 102b forms part of is poor (there is a large queue of data packets waiting to undergo processing stage 102b at time t=200 ms). However, in FIG. 3, steps S10 and S20 have been conducted by the PMU 120, 420 and as a result the number of SAP units 103, 403 implementing processing stage 102b is adjusted to five SAP units 103, 403. The result of this adjustment is that the performance of the pipeline 101 that processing stage 102b forms part of has improved (the queue of data packets waiting to undergo processing stage 102b at time t=200 ms is smaller). Moreover, in FIG. 2, three SAP units 103 are implementing processing stage 102c, meaning that there is underutilized processing capacity. In FIG. 3, the number of SAP units 103 on which processing stage 102c is implemented is decreased from three to one. Although this adjustment means that processing stage 102c can only be conducted on one data packet at a time, this does not hinder the passing of data through the processing pipeline 101 because there is still sufficient processing capacity for stage 102c that a data packet sent from processing stage 102b to 102c can begin being processed as soon as it arrives at processing stage 102c.

Figure 6:
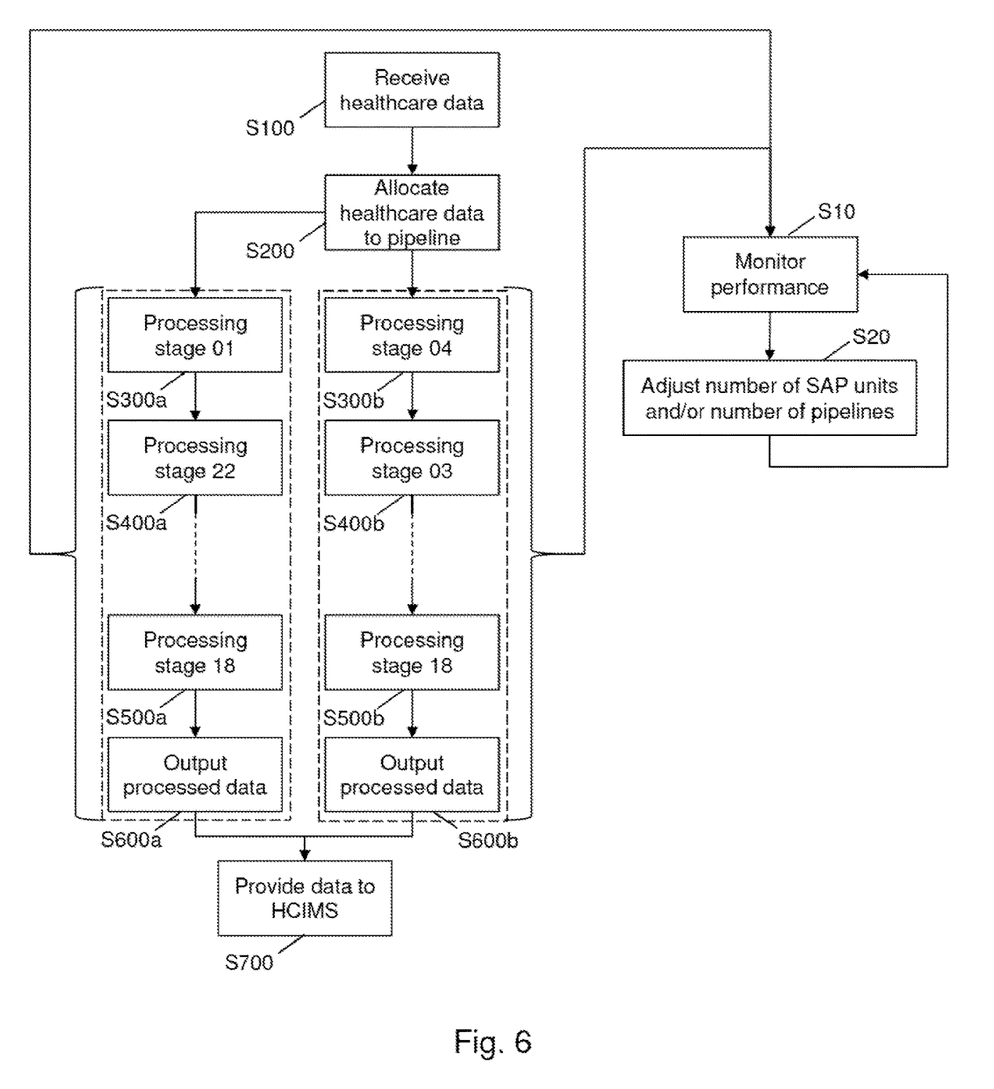
FIG. 6 includes a process flow diagram for a healthcare data management system processing healthcare data and a process flow diagram for a method of managing the processing capacity of that healthcare data management system.

FIG. 6 includes a PFD for a healthcare data management system 100, 400 processing healthcare data (steps S100-S700) and a PFD for a process of managing the processing capacity of that healthcare data management system 100, 400 (steps S10-S20).

With regards to the PFD for the healthcare data management system 100, 400 processing healthcare data, the PFD in FIG. 6 is very similar to the equivalent PFD in FIG. 5, except for that in FIG. 6 the PFD includes steps S300a-S600a corresponding to a first processing pipeline 101, 401 and steps S300b-S600b corresponding to a second processing pipeline 101, 401. Both the first processing pipeline 101, 401 and second processing pipeline 101, 401 are monitored and adjusted with regards to managing the processing capacity of the healthcare data management system 100, 400.

Considering the PFD for managing the processing capacity of the healthcare data management system 100, 400 (steps S10-S20), step S10 of the PMU 120, 420 monitoring the performance of the processing pipelines 101, 401 is the same as in FIG. 5. However, in FIG. 6, the step S20 of adjusting the processing capacity of the healthcare data management system 100, 400 includes the option of adjusting the number of SAP units 103, 403 implementing a given processing stage within a given processing pipeline (i.e. the same adjustment discussed in relation to FIG. 5) and also the option of adjusting the number of processing pipelines 101, 401 based on the monitored performance.

The PMU 120, 420 adjusting the number of processing pipelines 101, 401 may take the form of the PMU creating an additional processing pipeline 101, 401 that is formed of the same processing stages 102, 402 arranged in the same order as another processing pipeline 101, 401 already present in the healthcare data management system 100, 400 that the PMU 120, 420 is monitoring the performance of. In order to create an additional processing pipeline 101, 401, the PMU 120, 140 may receive definitions of one or more processing pipelines 101, 401, the definitions specifying a plurality of processing stages 102, 402 for the or each processing pipeline 101, 401. These definitions may be received, for example, from an administrator of the healthcare data management system or the definitions may be derived from a data packet which (internally) defines the pipeline it expects to be processed by. Thus, the healthcare data management system 100, 400 may be provided with multiple processing pipelines 101, 401 that can conduct the same processing as each other on the healthcare data they receive. Accordingly, the performance of a processing pipeline 101, 401 that has an additional, equivalent, processing pipeline 101, 401 created can be improved because at least a portion of the healthcare data packets that were being allocated to that processing pipeline 101, 401 can now be allocated to the additional processing pipeline 101, 401 that has been created by the PMU 120, 420.

Alternatively, the PMU 120, 420 adjusting the number of processing pipelines 101, 401 can also take the form of the PMU 120, 420 removing one or more processing pipelines 101, 401 from the healthcare data management system 100, 400. Where there is a plurality of processing pipelines 101, 401 formed of the same plurality of processing stages 102, 402 arranged in the same order as each other, removal of one of those processing pipelines 101, 401 does not remove the ability of the healthcare data management system 100, 400 to carry out the healthcare data processing of that processing pipeline 101, 401 (since another equivalent processing pipeline 101, 401 remains within the healthcare data management system 100, 400), but can reduce memory consumption within the healthcare data management system 100, 400 and reduce underutilized processing capacity within the healthcare data management system 100, 400. In some examples the PMU 120, 420 may remove all instances of a pipeline where it is determined that none are being used. The PMU may be responsive, i.e. in response to a request from a medical device or on receipt of data from a medical device, to create a processing pipeline where none currently exist. For example, an NMR machine may be taken offline for extended maintenance and so pipelines which utilise its data may not be used. In response, the PMU 120, 420 may remove these pipelines and only reinstate them when it detects that the NMR machine is back online and generating data.

Adjustment of the number of processing pipelines 101, 401 by the PMU 120, 420 may be utilised by the PMU 120, 420 where the monitoring of the performance of the processing pipeline(s) 101, 401 indicates that there is a plurality of the processing stages 102, 402 within a given processing pipeline 101, 401 that is overutilized (i.e. running near, or at, maximum capacity) or underutilized (i.e. running significantly under maximum capacity), or that there is an entire processing pipeline 101, 401 that is overutilized or underutilized.

Figure 7:
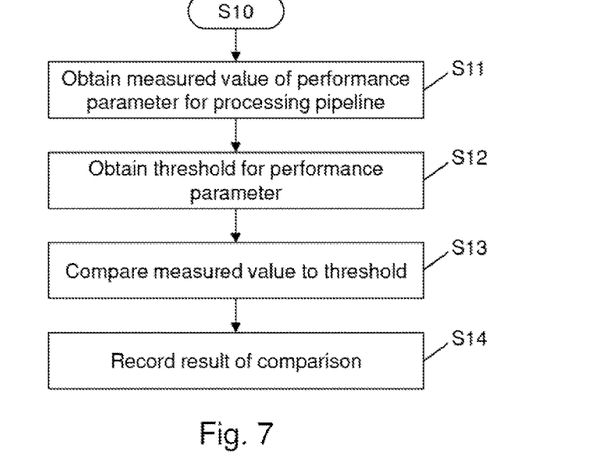
FIG. 7 is a process flow diagram for the step of a performance management unit monitoring the performance of a processing pipeline.

FIG. 7 is a PFD providing greater detail on an example of how step S10 in FIGS. 5 and 6 of monitoring performance of the processing pipeline(s) 101, 401 may be conducted. Step S10 is conducted by the PMU 120, 420. At step S11, the PMU 120, 140 obtains a measured value of one or more performance parameters for a processing pipeline 101, 401 that it is monitoring. The performance parameter(s) may be one (or more) of an amount of memory used by a given processing pipeline 101, 401 or processing stage 102, 402; a time taken for a healthcare data packet received from a given medical device to arrive at the healthcare middleware 115, 415; and an amount of processing capacity used by a given processing pipeline 101, 401 or processing stage 102, 402. At step S12, The PMU 120, 140 obtains one or more threshold values of performance parameter(s) for which measured values were obtained at step S11. For example, the threshold values may represent: a maximum amount of memory that can be used by a given processing pipeline 101, 401 or processing stage 102, 402; a maximum acceptable time for a healthcare data packet received from a given medical device to arrive at the healthcare middleware 115, 415; or a maximum amount of processing capacity that can be used by a given processing pipeline 101, 401, or processing stage 102, 402. At step S13, the PMU 120, 140 compares the measured value(s) of one or more performance parameters obtained at step S11 to the corresponding threshold value(s) obtained at step S12. At step S14, the result of step S13 is recorded within the healthcare data management system 100, 400 (e.g., stored in a cache or a long- or short-term memory).

Figure 8:
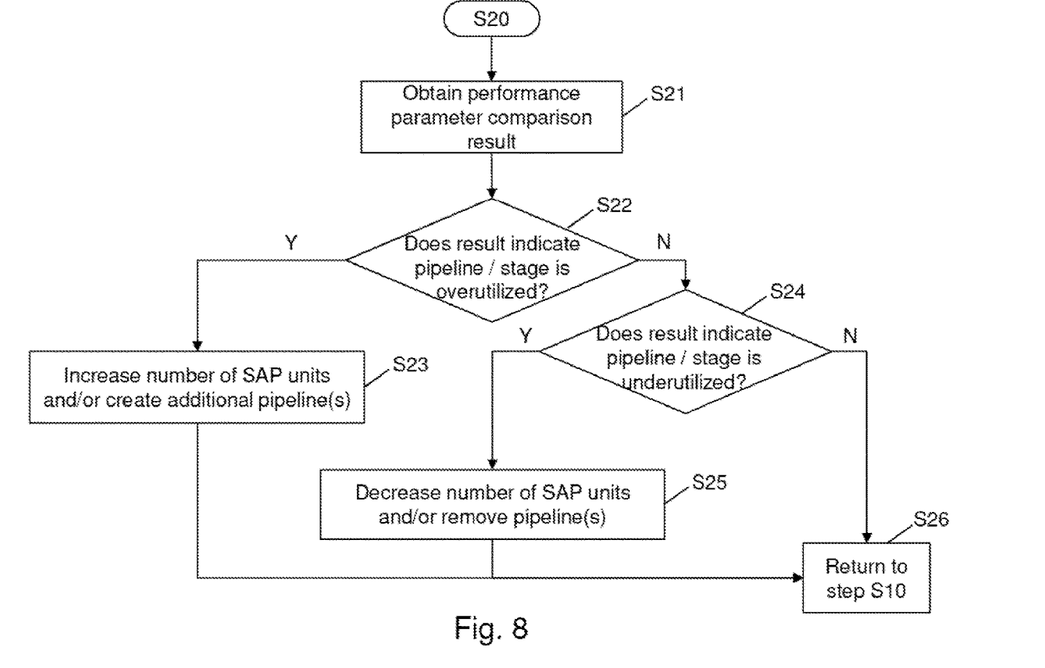
FIG. 8 is a process flow diagram for the step of determining an adjustment of the healthcare data management system to be made by a performance management unit.

FIG. 8 is a PFD providing greater detail on an example of how step S20 in FIGS. 5 and 6 of adjusting, based on the monitored performance, a number of SAP units 103, 403 implementing a given processing stage 102, 402 within a given processing pipeline 101, 401 and/or, in the case of step S20 in FIG. 6, adjusting the number of processing pipelines 101, 401 within the healthcare data management system 100, 400. Step S20 is conducted by the PMU 120, 420. At step S21, the PMU 120, 140 obtains one or more performance parameter comparison results stored at S14. Subsequently, at step S22, the PMU determines whether the result of the performance parameter comparison indicates that the processing pipeline 101, 401 and/or processing stage 102, 402 that it relates to is overutilized.

If the determination at step S22 is positive, the PMU 120, 420 proceeds to step S23, where the PMU 120, 140 increases the number of SAP units 103, 403 implementing a given processing stage 102, 402 within a given processing pipeline 101, 401 to which the performance parameter comparison result relates. Alternatively, or additionally, the PMU 120, 140 creates one or more additional processing pipelines 101, 401 that are formed of the same processing stages 102, 402 arranged in the same order as the processing pipeline 101, 401 to which the performance parameter comparison result relates. One, or both, of these actions is carried out by the PMU 120, 420 in order to improve the performance of that processing stage 102, 402 and/or processing pipeline 101, 401.

If the determination at step S22 is negative, the PMU 120, 420 proceeds to step S24, where the PMU 120, 140 determines whether the result of the performance parameter comparison indicates that the processing pipeline 101, 401 and/or processing stage 102, 402 that it relates to is underutilized.

If the determination at step S24 is positive, the PMU 120, 420 proceeds to step S25, where the PMU 120, 140 decreases the number of SAP units 103, 403 implementing a given processing stage 102, 402 within a given processing pipeline 101, 401 to which the performance parameter comparison result relates. Alternatively, or additionally, in the case that there is a plurality of processing pipelines 101, 401 that are formed of the same processing stages 102, 402 arranged in the same order as the processing pipeline 101, 401 to which the performance parameter comparison result relates, the PMU 120, 420 can remove one or more of such processing pipelines 101, 401. One, or both, of these actions is carried out by the PMU 120, 420 in order to reduce the memory consumption within the healthcare data management system 100, 400 and reduce underutilized processing capacity present within the healthcare data management system 100, 400.

Following step S23 or S25, or following a negative determination at step S24, the PMU 120, 140 proceeds to step S26, where the PMU 120, 140 is instructed to return to step S10 for further performance monitoring of one or more processing pipelines 101, 401 whilst the healthcare data management system 100, 400 is operating.

Figure 9:
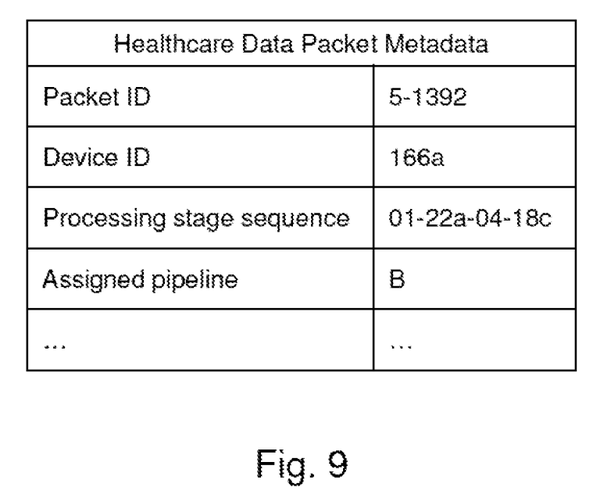
FIG. 9 is an example of metadata included within a healthcare data packet.

FIG. 9 is an example of metadata included with a healthcare data packet. FIG. 9 illustrates the metadata that may be included in a healthcare data packet: a packet ID that can be used to identify the data within the packet; a device ID that can be used to identify the medical device from which the data packet originated; a processing stage sequence that indicates the sequence of processing stages 102, 104 that the healthcare data within the packet needs to undergo; and a processing pipeline 101, 401 that has been assigned to the healthcare data packet for it to pass through based on the processing stage sequence specified for the healthcare data within the packet. The metadata includes information allowing the healthcare data packet to be provided to the correct processing pipeline 101, 401 with the correct series of processing stages 102, 402 in order to obtain the desired processed data from the healthcare data. Where a given processing stage is being implemented in parallel on a plurality of stateless atomic processing units, the metadata also includes information identifying which of the plurality of stateless atomic processing units the data packet has been assigned to. For example, in FIG. 9, the processing stage sequence is defined as: 01-22a-04-18c. This indicates that the data packet should be processed first by processing stage 01. Next, it should be processed by processing stage 22 and stateless atomic processing unit a (for example, $102a_1$ as discussed above). Next, it should be processed by processing stage 04, which finally provides the data packet to processing stage 18 and stateless atomic processing unit c (for example, $102c_3$ with reference to FIG. 1).

The metadata may be generated by the performance management unit 120, 420, at an initial stage in the process, and inserted into the healthcare data packet upon its receipt by the healthcare data management system 100, 400. The metadata then moves with the healthcare data packet through the process. Alternatively, the performance management unit 120, 420 may be communication with the medical devices and may either instruct them on how to generate the metadata or provide the metadata to the medical devices for encapsulation within the healthcare data packet.

The term 'laboratory instrument' as used herein encompasses any apparatus or apparatus component operable to execute one or more processing steps/workflow steps on one or more biological samples and/or one or more reagents. The term 'instrument' covers pre-analytical instruments, post-analytical instruments and also analytical instruments.

The term 'analyzer'/'analytical instrument' as used herein encompasses any apparatus or apparatus component configured to obtain a measurement value. An analyzer is operable to determine via various chemical, biological, physical, optical or other technical procedures a parameter value of the sample or a component thereof. An analyzer may be operable to measure said parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectrometry of proteins or metabolites and physical or chemical parameters of various types. An analytical instrument may comprise units assisting with the pipetting, dosing, and mixing of samples and/or reagents. The analyzer may comprise a reagent holding unit for holding reagents to perform the assays. Reagents may be arranged for example in the form of containers or cassettes containing individual reagents or group of reagents, placed in appropriate receptacles or positions within a storage compartment or conveyor. It may comprise a consumable feeding unit. The analyzer may comprise a process and detection system whose workflow is optimized for certain types of analysis. Examples of such analyzers are clinical chemistry analyzers, coagulation chemistry analyzers, immunochemistry analyzers, urine analyzers, nucleic acid analyzers, used to detect the result of chemical or biological reactions or to monitor the progress of chemical or biological reactions.

The term 'pre-analytical instrument' as used herein encompasses any apparatus or apparatus component that is configured to perform one or more pre-analytical workflow steps comprising—but not limited to—centrifugation, resuspension (e.g. by mixing or vortexing), capping, decapping, recapping, sorting, tube type identification, sample quality determination and/or aliquotation steps. Said steps may also comprise adding chemicals or buffers to a sample, concentrating a sample, incubating a sample, and the like.

The term 'post-analytical instrument' as used herein encompasses any apparatus or apparatus component that is configured to perform one or more post-analytical workflow steps comprising—but not limited to—sample unloading, transport, recapping, decapping, temporary storage/buffering, archiving (refrigerated or not), retrieval and/or disposal.

The term 'point-of-care device' as used herein encompasses any analyzer used in a point-of-care environment, such as (but not limited to) blood glucose testing, coagulation testing, blood gas and electrolytes analysis, urinalysis, cardiac markers analysis, hemoglobin diagnostics, infectious disease testing, cholesterol screening or nucleic acid testing NAT. Results may be viewed directly on the POC analyzer/device(s) or may be sent to and displayed in a healthcare information management system.

The term 'healthcare data' as used herein encompasses any data obtained from one or more medical devices through operation of such a device on one or more patients, or one or more samples obtained therefrom.

The term 'connected' as used herein encompasses both direct and indirect communication pathways between two or more elements. A communications pathway may be provided through a physical entity such as a wired connection or may be provided through a non-physical communication system such as a network.

The term 'stateless' as used herein encompasses there being no record of preceding events in a given sequence of interactions with another computer or program, a device or other outside element; each interaction request has to be handled based entirely on information that comes with that interaction request.

The term 'atomic processing unit' as used herein encompasses a processing unit that carries out a specified process that is an indivisible and irreducible series of operations that either occur in their entirety or not at all.

The systems and methods of the above embodiments may be implemented in a computer system (in particular in computer hardware or in computer software) in addition to the structural components and user interactions described.

The term 'computer system' includes the hardware, software and data storage devices for embodying a system or carrying out a method according to the above described embodiments. For example, a computer system may comprise a central processing unit (CPU), input means, output means and data storage. The computer system may have a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term 'computer readable media' includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

In particular, although the methods of the above embodiments have been described as being implemented on the systems of the embodiments described, the methods and systems of the present disclosure need not be implemented in conjunction with each other, but can be implemented on alternative systems or using alternative methods respectively.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCE NUMERALS

100 Healthcare data management system
101a-b Processing pipeline
102a-f Processing stage
103 Stateless atomic processing unit
110 Laboratory instrument
115 Healthcare Middleware
120 Performance management unit
125 Healthcare information management system
400 Healthcare data management system
400a-c Processing pipeline
402a-l Processing pipeline
403 Stateless atomic processing unit
410a-n Laboratory instrument
412a-m Point-of-care device
415 Healthcare Middleware
420 Performance management unit
425 Healthcare information management system

The invention claimed is:

1. A computer-implemented method of managing processing capacity in a healthcare data management system, the method comprising:
    obtaining healthcare data from a plurality of medical devices;
    receiving the healthcare data at one or more processing pipelines, wherein each of the one more processing pipelines comprises a plurality of processing stages, the processing stages being arranged in series and performing respective operations on the received healthcare data, where each processing stage of the one or more processing pipelines is implemented on at least one stateless atomic processing unit not shared with another processing stage of the one or more processing pipelines;
    receiving, by a healthcare middleware, data processed by the one or more processing pipelines and providing the processed data to a healthcare information management system;
    managing the processing capacity of the one or more processing pipelines by a performance management unit, wherein managing the processing capacity of the one or more processing pipelines comprises:
        monitoring a performance of each of the one or more processing pipelines and a performance of each of the plurality of processing stages; and
        adjusting a number of stateless atomic processing units implementing any processing stage of the plurality of processing stages within a given processing pipeline based on the monitored performance of each of the one or more processing pipelines and the monitored performance of each of the plurality of processing stages.

2. The computer-implemented method of claim 1, wherein the one or more processing pipelines comprises a plurality of processing pipelines, and one or more of a processing type of the processing stages within a given processing pipeline of the plurality of processing pipelines are shared with another processing pipeline of the plurality of processing pipelines.

3. The computer-implemented method of claim 1, wherein the performance management unit monitors the performance of each of the one or processing pipelines and the performance of each of the plurality of processing stages by comparing a performance parameter to a performance threshold.

4. The computer-implemented method of claim 1, wherein the performance management unit monitors one or more performance parameters of each of the one or more processing pipelines and of each of the plurality of processing stages, the performance parameters comprising one or more of:
    an amount of memory used by a given processing pipeline or processing stage;
    a time taken for healthcare data received from a given medical device to arrive at the healthcare middleware; and
    an amount of processing capacity used by a given processing pipeline or processing stage.

5. The computer-implemented method of claim 1, wherein the one or more medical devices comprise one or more laboratory instruments and/or one or more point of care devices.

6. The computer-implemented method of claim 1, wherein the performance management unit receives definitions of one or more processing pipelines, the definitions specifying one or more processing stages for each of the one or more processing pipelines, and creates additional processing pipelines based on the monitored performance of each of the one or more processing pipelines and the monitored performance of each of the plurality of processing stages.

7. The computer-implemented method of claim 1, wherein a given, or each, stateless atomic processing unit is provided as either a physical machine or a virtual machine.

8. The computer-implemented method of claim 1, wherein the performance management unit:
    increases a number of stateless atomic processing units implementing a given processing stage within a given processing pipeline in response to determining that the monitored performance indicates the given processing pipeline is overutilized; and
    decreases a number of stateless atomic processing units implementing a given processing stage within a given processing pipeline, or removes one or more processing pipelines, in response to determining that the monitored performance indicates a given processing pipeline is underutilized.

9. The computer-implemented method of claim 1, wherein each processing stage of the plurality of operating stages is formed from an indivisible and an irreducible series of sub-operations that either occur in their entirety or not at all.

10. A healthcare data management system, the healthcare data management system comprising:
    a plurality of stateless processing units;
    one or more processing pipelines connected to one or more of medical devices configured to generate healthcare data, and the one or more processing pipelines configured to receive the medical data therefrom, wherein each of the one or more processing pipelines comprises a plurality of processing stages, the processing stages being arranged in series and configured to perform respective operations on the received healthcare data, wherein each processing stage of the one or more processing pipelines is implemented on at least one stateless atomic processing unit not shared with another processing stage of the one or more processing pipelines;

a healthcare middleware connected to the one or more processing pipelines and configured to receive processed data therefrom and to provide the processed data to a healthcare information management system;

a performance management unit configured to manage the processing capacity of each of the one or more processing pipelines by:

monitoring a performance of each of the one or more processing pipelines;

monitoring a performance of each of the plurality of processing stages; and adjusting a number of stateless atomic processing units from the plurality of stateless processing units implementing any processing stage of the plurality of processing stages within a given processing pipeline of the one or more processing pipelines based on the monitored performance of each of the one or more processing pipelines and the monitored performance of each of the plurality of processing stages.

11. The healthcare data management system of claim 10, wherein the one or more processing pipelines comprise a plurality of processing pipelines, and one or more a processing type of the processing stages of the plurality of processing states within a given processing pipeline of the plurality of processing pipelines are shared with another processing pipeline of the plurality of processing pipelines.

12. The healthcare data management system of claim 10, wherein the performance management unit is configured to monitor the performance of each of the one or more processing pipelines and the performance of each of the plurality of processing stages by comparing a performance parameter to a performance threshold.

13. The healthcare data management system of claim 10, wherein the performance management unit is configured to monitor one or more performance parameters of each of the one or more processing pipelines and of each of the plurality of processing stages, the one or more performance parameters comprising one or more of:

an amount of memory used by a given processing pipeline or processing stage;

a time taken for healthcare data received from a given medical device to arrive at the healthcare middleware; and an amount of processing capacity used by a given processing pipeline or processing stage.

14. The healthcare data management system of claim 10, wherein the performance management unit is configured to receive definitions of one or more processing pipelines, the definitions specifying one or more processing stages for the or each processing pipeline, and creates additional processing pipelines based on the monitored performance.

15. The healthcare data management system of claim 10, wherein the performance management unit is configured to:

increase a number of stateless atomic processing units implementing a given processing stage within a given processing pipeline of the one or more processing pipelines in response to determining that the monitored performance indicates the given processing pipeline is overutilized; and decrease a number of stateless atomic processing units implementing a given processing stage within a given processing pipeline of the one or more processing pipelines, or removes one or more processing pipelines of the one or more processing pipelines, in response to determining that the monitored performance indicates a given processing pipeline is underutilized.

16. The healthcare data management system of claim 10, wherein the one or more medical devices comprise one or more laboratory instruments and/or one or more point of care devices.

17. The healthcare data management system of claim 10, wherein the performance management unit is configured to receive definitions of one or more processing pipelines, the definitions specifying one or more processing stages for each of the one or more processing pipelines, and create additional processing pipelines based on the monitored performance of each of the one or more processing pipelines and the monitored performance of each of the plurality of processing stages.

18. The healthcare data management system of claim 10, wherein a given, or each, stateless atomic processing unit is provided as either a physical machine or a virtual machine.

19. A non-transitory computer-readable storage medium, containing machine executable instructions which, when executed on one or more processors, cause the one or more processor(s) to a computer-implemented method of managing processing capacity in a healthcare data management system, the method comprising:

obtaining healthcare data from a plurality of medical devices;

receiving the healthcare data at one or more processing pipelines, wherein each of the one more processing pipelines comprises a plurality of processing stages, the processing stages being arranged in series and performing respective operations on the received healthcare data, where each processing stage of the one or more processing pipelines is implemented on at least one stateless atomic processing unit not shared with another processing stage of the one or more processing pipelines;

receiving, by a healthcare middleware, data processed by the one or more processing pipelines and providing the processed data to a healthcare information management system;

managing the processing capacity of the one or more processing pipelines by a performance management unit, wherein managing the processing capacity of the one or more processing pipelines comprises:

monitoring a performance of each of the one or more processing pipelines and a performance of each of the plurality of processing stages; and adjusting a number of stateless atomic processing units implementing any processing stage of the plurality of processing stages within a given processing pipeline based on the monitored performance of each of the one or more processing pipelines and the monitored performance of each of the plurality of processing stages.

* * * * *